United States Patent [19]
Grall

[11] Patent Number: 6,002,647
[45] Date of Patent: Dec. 14, 1999

[54] ACOUSTIC TRANSMITTING ANTENNA FOR UNDERWATER SEISMIC PROSPECTING

[75] Inventor: Georges Grall, Biot, France

[73] Assignee: Thomson Marconi Sonar SAS, Sophia Antipolis, France

[21] Appl. No.: 09/107,272

[22] Filed: Jun. 30, 1998

[30] Foreign Application Priority Data

Jun. 30, 1997 [FR] France .................................. 97 08206

[51] Int. Cl.⁶ ...................................................... H04R 1/44
[52] U.S. Cl. .......................................... 367/154; 367/173
[58] Field of Search .............................. 367/24, 57, 154, 367/165, 173, 188

[56] References Cited

U.S. PATENT DOCUMENTS

| | | | |
|---|---|---|---|
| 3,331,050 | 7/1967 | Kilmer et al. | 367/24 |
| 4,064,479 | 12/1977 | Ruehle | 367/154 |
| 4,188,610 | 2/1980 | Nelson | 367/14 |
| 4,234,939 | 11/1980 | Grall | 367/105 |
| 4,497,044 | 1/1985 | Silverman | 367/57 |
| 4,510,586 | 4/1985 | Grall et al. | 367/154 |
| 4,596,007 | 6/1986 | Grall et al. | 367/105 |
| 4,632,213 | 12/1986 | Domenico | 367/144 |
| 4,779,239 | 10/1988 | Grall | 367/104 |
| 4,794,574 | 12/1988 | Grall | 367/154 |
| 4,951,268 | 8/1990 | Grall | 367/105 |
| 5,058,081 | 10/1991 | Gulli et al. | 367/130 |
| 5,142,498 | 8/1992 | Duren | 367/153 |

FOREIGN PATENT DOCUMENTS 2081446  2/1982  United Kingdom .

OTHER PUBLICATIONS

Duren: "A theory for marine source arrays"; Geophysics, vol. 54, No. 5, May 1988, Tulsa, OK, U.S.A., pp. 650–658.

*Primary Examiner*—Daniel T. Pihulic
*Attorney, Agent, or Firm*—Oblon, Spivak, McClelland, Maier & Neustadt, P.C.

[57] ABSTRACT

A device for transmitting acoustically toward the bottom of the sea includes an arrangement of a cable 404 containing vertically suspended electro-acoustic transducers 403 wherein each of said transducers are assigned to a frequency of the pulse spectrum to be emitted. The transducers are attached to the cable at such positions whereby the wave transmitted toward the sea floor is in phase with the reflective wave on the surface of the sea The superimposition of different elementary signals constitutes a single strong pulse. The device replaces air gun devices for oil exploration.

2 Claims, 3 Drawing Sheets

ACOUSTIC TRANSMITTING ANTENNA FOR UNDERWATER SEISMIC PROSPECTING

BACKGROUND OF THE INVENTION

1. Field of the Invention

This invention pertains to acoustic transmitting antennas which allow one to transmit within the sea acoustic signals which can penetrate into the undersea depths in order to determine the structure of this site, in particular to detect the possible presence of oil.

2. Dicussion of the Background

At present, exploration for oil at sea is conducted by immersing at shallow depth one or several acoustic sources and by using towed linear acoustic antennas which are dragged along behind a ship. These linear acoustic antennas are essentially made of a hollow cable in which hydrophones arranged along the length of this cable are enclosed. The towing ship drags these antennas at relatively slow speed, on the order of 5 knots, in order to accurately gather the signals.

The acoustic signals corresponding to the sources are directed toward the ocean bottom, to the interior of which they penetrate. They are then reflected, as in land exploration, by layers of the subsoil, then they enter the water again and are detected by the hydrophones of the acoustic linear antennas. The bottom of the sea behaves as an additional interface with respect to the interfaces between the different layers of the subsoil. The additional interface simply has more pronounced characteristics than the others, an obviously greater impedance discontinuity in particular.

Because of this considerable change of impedance, it is essentially the low frequency components of the shock wave which effectively penetrate into the undersea depths, however with relatively low efficiency. This phenomenon is identical during the recrossing of the waves between the ocean bottom and the water before reaching the hydrophones.

The overall efficiency thus being relatively low, one must use very powerful acoustic sources.

To date, the only sources which provide satisfaction are devices known by the name of air guns. These devices are not very satisfactory because they are heavy and cumbersome, and they require a compressed air power source from the towing ship.

In addition, the shock wave caused by operation of such a device propagates almost omnidirectionally. The result is that only the weak portion directed toward the sea floor is useful. In addition, the part directed toward the surface is reflected toward the latter and disturbs the useful portion of the impulse.

In order to overcome these disadvantages, different systems have been proposed. In particular, a U.S. Pat. No. 4,632,213 issued on Dec. 30, 1986 in the name of Samuel N. Domenico proposes that one enclose the air gun in a series of concentric tubes which will form the envelope of a paraboloid. These tubes are equipped with perforations through which one can inject the air. The mixture of water and air forms a reflecting discontinuity which has the shape of the paraboloid which encloses the tubes. One can thereby obtain the effect of a reflecting mirror which concentrates on the bottom of the sea the emitted shock wave. However, this device is quite complicated, which further aggravates the difficulties of its implementation. It has been determined in particular that this patent envisages only its use at a fixed station from a drilling platform. Indeed, if one anticipates towing such a device behind a ship, as is frequently the case for air guns used in the traditional manner, one will experience not only great difficulties of implementation, but the relative movement of the water with respect to the device will begin to considerably disturb the shape of the emulsified layer which forms the reflector, which would seriously harm the performance of the unit.

SUMMARY OF THE INVENTION

According to the present invention, the difficulties of the prior art are overcome by a device including a floatation device, a cable vertically suspended under the floatation device and a set of acoustic sources attached to the cable wherein the acoustic sources are a vibrating motor transducer secured so that the acoustic wave transmitted toward the bottom of the sea will be in phase with the acoustic wave reflected by the surface of the sea toward the sea floor.

The present invention also proposes utilizing a set of containers attached to the cable at places determined for securing electro-acoustic transducers which contain the transducers and associated electronic devices. The cable is electrically conducting and the floatation device includes a well enabling the containers to pass through and in which the cable slides. A return pulley supports the cable and locking devices immobilize the cable.

Another feature of the present invention is that the electronically conducting cable includes a set of conductors used to separately provide power for each transducer and floatation devices which include a cavity having a hollow drum secured to the cavity which provides for wrapping the cable provided with the transducers. The internal cavity of the drum houses electronic components for powering transducers through the electrically conducting cable and a rotating joint is provided for connecting the electronic components to a power cable connected to a towing ship. A reduction motor allows wrapping of a cable and the transducers on the drum.

DESCRIPTION OF THE DRAWINGS

Other special features and advantages of the invention will be clearly apparent from the following description, which is given as a non-limiting example with respect to the attached figures which show.

DETAILED DESCRIPTION OF THE PREFERRED EMBODIMENTS

A more complete appreciation of the invention and many of the intended advantages thereof will be readily obtained as the same becomes better understood by reference to the following detailed description when considered in connection with the accompanying drawings.

Figure 1:
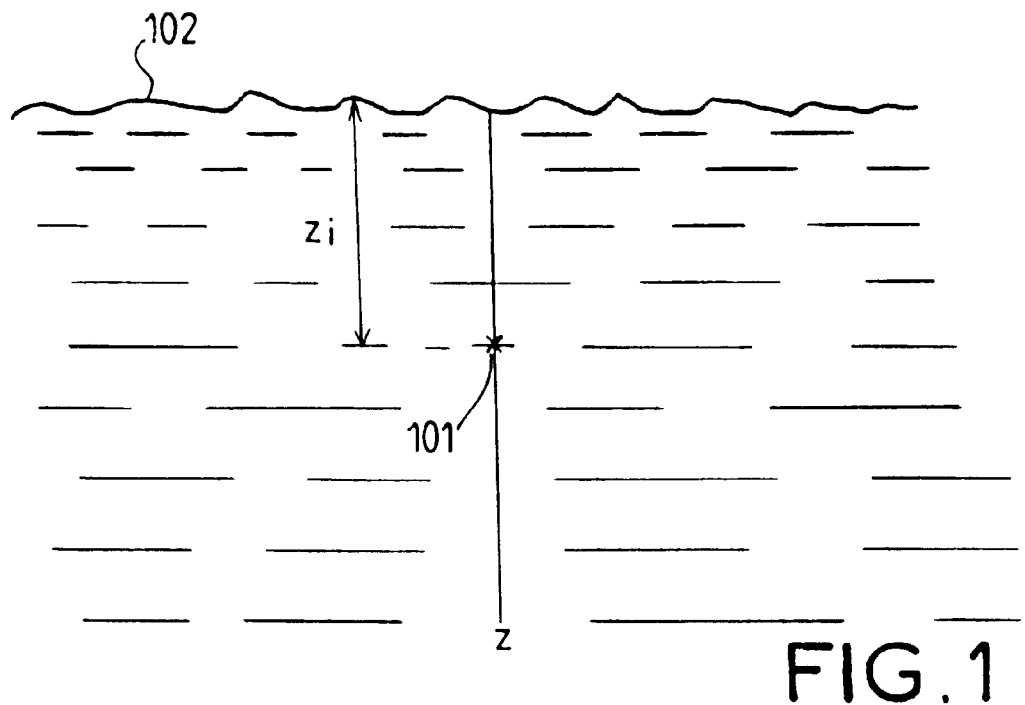
FIG. 1, a basic diagram of emission from an immersed single source.

In the basic diagram shown in FIG. 1, which is limited to a single source, an acoustic source 101 is immersed to a depth $z_i$, below sea level 102. This source includes an electro-acoustical transducer of the vibrating motor type. This motor can be made by any means known in the art, with piezoelectric, traditional electrodynamic or variable reluctance components for example. The important point is to be able to easily reproduce all the desired wave forms at low frequency.

The source 101, which we will call Si, then will emit a monochromatic acoustic wave at frequency fi which corresponds to a pulse ωi and to a wavelength:

$$\lambda i = c/2\pi fi \tag{1}$$

At any point the acoustic field created by this source will be obtained by the superimposition of two waves: the direct wave given by:

$$Ai \cos \omega_i t \tag{2}$$

and the reflected wave given by:

$$A_r \cos(\omega_i t + \phi z_i, \lambda_i) \tag{3}$$

where $$\phi z_i, \lambda_i = 2\pi f_i/c 2 z_i - \pi = \pi(4z_i/\lambda i - 1) \tag{4}$$

The term under π corresponds to phase inversion caused by reflection on the surface of the sea.

The invention proposes that one place the source Si at a depth $Z_i$ which allows one to obtain phase re-synchronization of these two waves, which amounts to saying that this phase should assume a value equal to 2kπ.

By expressing this condition with respect to immersion $z_i$, the latter is given by:

$$z_i = \lambda_i/4(2k+1) \tag{5}$$

and in the simplest case in which k=0

$$z_i = \lambda_i/4 \tag{6}$$

In a known manner, the emission of a short pulse which forms a shock wave corresponds to the simultaneous emission of a set, in principle infinite, of waves that have low level pure frequencies in which the frequencies extend from 0 to infinity in principle.

In practice, considering that the pulse will not be infinitely steep and that the high frequencies are rapidly absorbed by water, one can limit oneself to emitting a discrete number of monochromatic frequencies that are separated by a finite value and whose upper value is not excessive.

In order to emit pure frequencies one will use, according to the invention, a set of sources that are dedicated respectively to each of these frequencies and are immersed at different depths which allow one to respect the relationship (6) for each source.

One can optimize the set of frequencies used in this manner in different ways.

Each source will emit a frequency fi associated with a frequency band Δfi so that the reference frequency immediately greater $f_{i+1}$ is equal to fi+Δfi. The over voltage factor Q of each source is equal to fi/Δfi, or $f_{i+1} = fi(1+1/Q)$.

Under these conditions, if one desires the ability to emit over a frequency band going from f0 to fn, the emitted band is given by:

$$B = f_n = f_0 = f_0[(1+1/Q)^n - 1] \tag{7}$$

Therefore, starting with a passband B and an over voltage factor Q which are given, one will obtain the number n of transducers to be used from equation (7).

The value of Q will be determined by imposing on the sum of the direct wave and the reflected wave for example a given maximum attenuation, at frequency fi+Δfi/2 with respect to the central frequency fi.

In a numerical example which corresponds to the values currently being used, one will desire to be able to emit in a band of 5 to 100 Hz with an over voltage factor varying between 5 and 10.

Under these extreme conditions one will obtain for these two values, n=15 sources for Q=5, and n=27 sources for Q=10.

Figure 2:
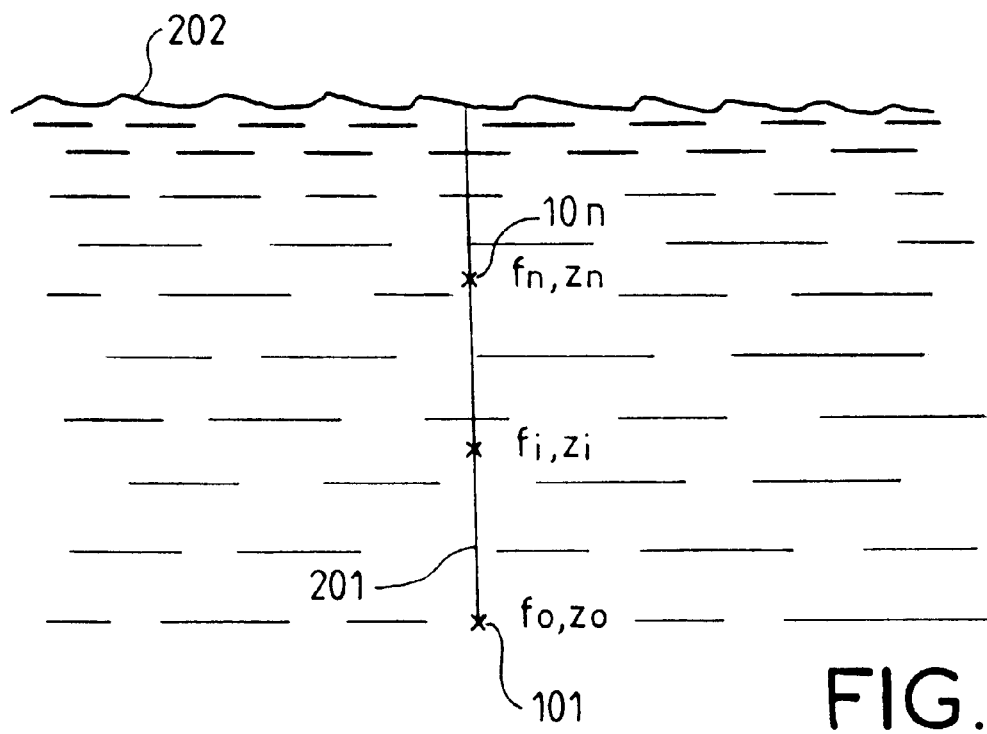
FIG. 2, a circuit diagram showing emission of a set of immersed sources.

The corresponding transducers are then attached, as shown in FIG. 2, to an electrically conducting cable 201 which allows one at once to ensure correct positioning of these transducers and their power delivery by appropriate signals.

This electrically conducting cable is suspended in water from a ship not shown here, and the n sources 101 to 10n which correspond to the frequencies f0 through fn are located at immersion depths z0 through zn which follow according to a geometric progression.

In the case in which Q=5 the distribution of the frequencies and the immersions as a function of the source are given by the following table:

| S | f(Hz) | Z(m) |
| --- | --- | --- |
| S1 | 7.0 | 53.0 |
| S2 | 8.4 | 44.6 |
| S3 | 10.1 | 37.0 |
| S4 | 12.1 | 30.9 |
| S5 | 14.52 | 25.79 |
| S6 | 17.42 | 21.5 |
| S7 | 20.9 | 17.9 |
| S8 | 25.08 | 14.9 |
| S9 | 30.10 | 12.4 |
| S10 | 36.12 | 10.3 |
| S11 | 43.34 | 8.64 |
| S12 | 52.01 | 7.2 |
| S13 | 62.41 | 6.0 |
| S14 | 74.9 | 5.0 |
| S15 | 89.9 | 4.17 |

Figure 3:
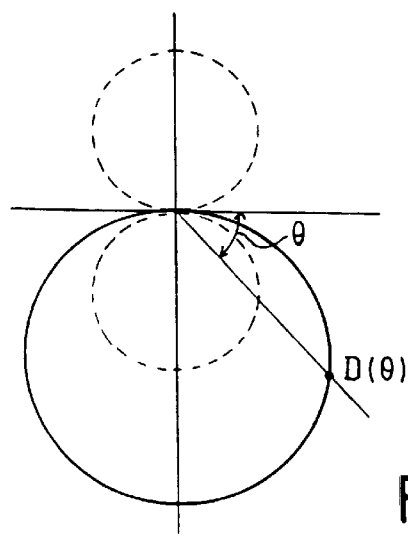
FIG. 3, a general emission diagram of an antenna in accordance with the invention.

In a known manner, the directivity diagram of such an antenna is that of a dipole in which the sources are distant from λ whatever the value of λ. This diagram is shown in FIG. 3 and the strength D in the direction θ is given by the relationship:

$$D(\theta) = 2A \cos(\pi \sin\theta) \tag{8}$$

in which A is a proportionality factor.

One can therefore determine that this directivity does not depend on frequency and is constant whatever the frequency emitted over the entire band.

In addition, the opening of at least 3 decibels is 30 degrees, which corresponds to a gain of 16 decibels with respect an omnidirectional source.

These results of course assume that each source is sized in order to obtain the same sound level whatever the emission frequency at which it is used.

The power for all these sources can be effected in different ways:

A first method consists in using a long code which corresponds to frequency modulation (linear or hyperbolic). To accomplish this, one starts with a generator which produces a frequency corresponding to this modulation and one applies the latter, through the intermediary of a set of separate power amplifiers for each source, to each of these sources successively during the duration in which the delivered frequency corresponds to the passband of the selected source. In the known manner, the use of such a long code requires an adaptive filter at the reception end.

A second method consists in applying to the different sources short pulses of a frequency which correspond to the frequency for which the position of this source has been calculated.

Since the sources are separated from one another so that the superimposition of the acoustic signals will cause generation of the short pulse, the power delivery of these different sources is accomplished with a time delay corresponding to the paths of the acoustic waves between the sources, which results in carrying out time synthesis. One can thereby obtain pulses in which the width does not exceed the value 1/B and in which the secondary lobes can be controlled electrically by balancing the levels of the applied signals.

When each of the sources emits a signal of duration P, the emitted energy is then proportional to the product N×T and it can then be greater than that emitted by a device of the air gun type, in which the emission duration is relatively short and cannot be prolonged.

One can use different solutions in order to regulate the problem of providing power for the transducers, as well as the problem of placing said antenna in water and retrieving it.

Figure 4:
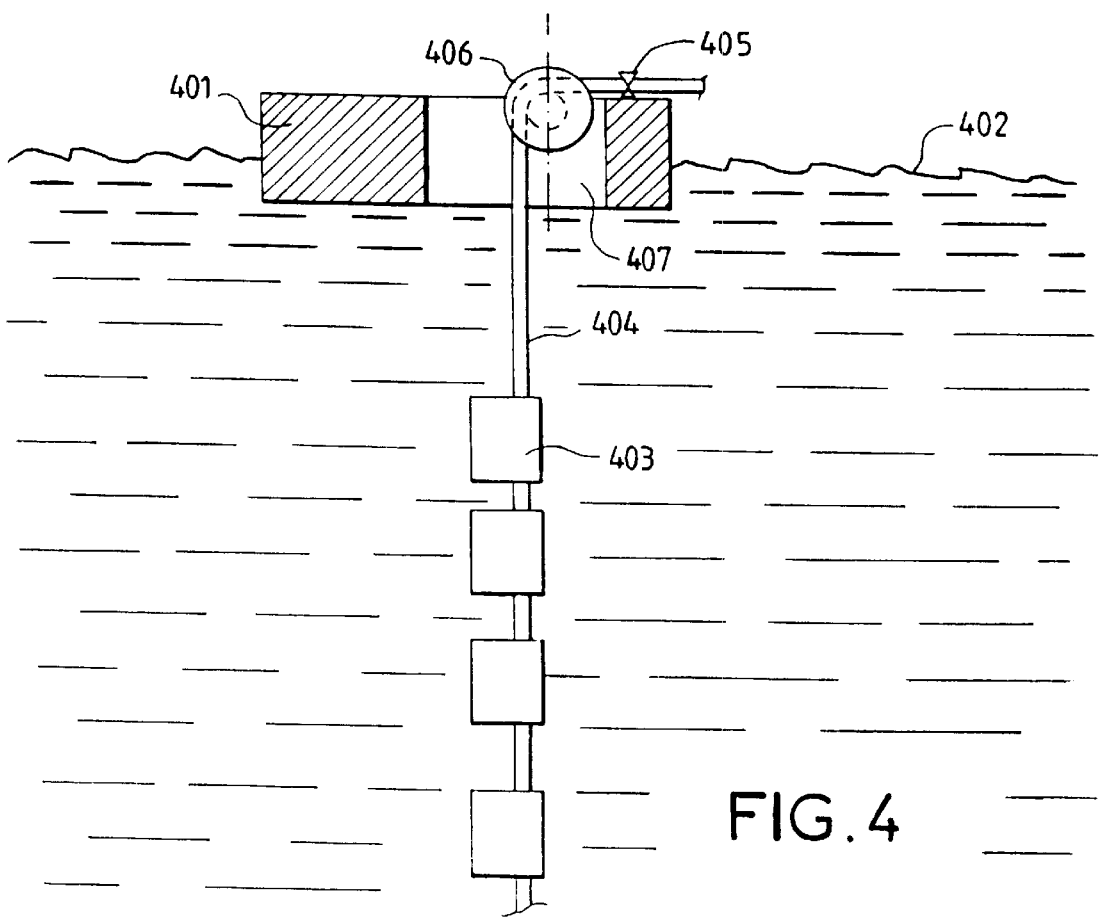
FIG. 4, a schematic sectional view of a device in accordance with a first implementation of the invention.

In a first mode of implementation, as shown in FIG. 4, one uses a flotation device 401 which floats on the surface 402 of the sea while supporting the antenna. The latter is comprised of a set of containers 403 which are secured to an electrically conducting cable 404 at places determined by the calculation method described earlier.

In the deployed position this cable, with its containers which are attached above, hangs vertically below the flotation device to which it is attached by a locking system 405 which is secured to the upper surface of this said flotation device. On the lower side of this locking system the cable 404 comes to rest on a pulley 406 with a horizontal shaft from which it hangs toward the bottom of the sea crossing over a well 407 which is arranged vertically in the body of the flotation device.

On the upper side of the locking system 405 the cable extends toward the towing ship, to which it is attached. The resistance of this cable is provided in order to be able not only to support the containers 403, but also to resist the forces of traction from the ship.

Each of the containers 403 contains, on the one hand, the electro-acoustic transducer which is to emit the frequency corresponding to the place where the container is attached, and on the other hand the electronic devices, in particular the power amplifier and the control components, which allow one to provide power for this transducer with the required signals.

In this mode of implementation, the cable 404 can then be simply a two-wire unit from the electrical point of view and will carry only the supply power necessary for the components which are stored in the containers. Starting of the control components, as well as their synchronization in the different containers, could be accomplished with a very simple synchronization signal that can be superimposed on the supply signal, or even by other means known in the art, as, for example, by means of an acoustic remote control signal emitted from the towing ship.

When the antenna is not used one will reel in cable 404 onto a winch located on the carrier ship by unlocking the locking devices 405.

The antenna unit will then rise by crossing over the wall 407 and turning around the pulley 406. A locking element not shown here, for example an appropriate hook attached to the last container, will allow the flotation device to be raised at the end of the operation onto the ship.

Figure 5:
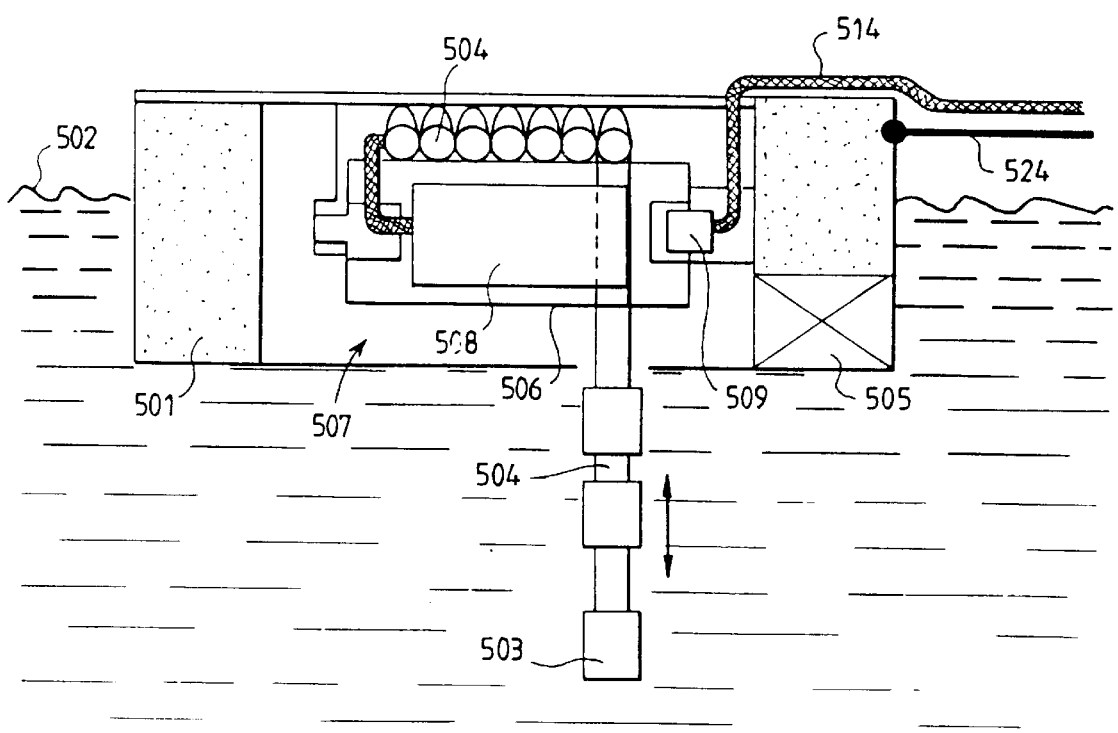
FIG. 5, a sectional view of the device according to a second implementation of the invention.

In a second mode of implementation, as shown in FIG. 5, one will use a flotation tank 501 which floats on the surface of the sea 502 and in which all the electronic components are housed, especially the power amplifiers and the control software.

This allows one to limit the size of the containers 503 attached along the vertical cable 504, by housing in these containers only the electro-acoustical transducers, which reduces the weight of the antenna and its drag.

The containers are then small enough so that the cable 504/container 503 set can be wrapped around the drum of a winch 506 stored in an internal cavity 507 of the flotation device 501. This winch is driven by a reduction gear motor 505 which allows lowering and raising of the antenna.

This drum is narrow and hollow which allows one to place inside it all the electronics 508, power amplifiers, frequency generators, control software and so forth.

In this implementation, it is necessary that the cable contain as many power conductors of the electro-acoustical transducers as there are containers 503. Consecutive increase in the sizes of the cable is compensated for by the decrease in the number of strands of this cable which are used to support the containers, since the latter are lighter.

The electric power arrives from the carrier ship through a cable 514, which can be simply a two-wire unit and which is connected to the components contained in drum 506 through the intermediary of a rotating joint 509.

Since there are only two connections to be made by this rotating joint, the latter can be simple and therefore rugged.

A towing cable 524 allows one to tow the flotation tank 501.

As a variant one can use a single electrically powered towing cable which allows one to tow and provide electric power at the same time for the unit contained in the winch drum.

I claim:

1. An acoustic transmitting antenna for underwater seismic exploration including a floatation device for floating on the surface of the sea and a cable vertically suspended under said floatation device with a set of acoustic sources attached to the cable, wherein said acoustic sources are vibrating motor transducers and are secured at positions whereby an acoustic wave transmitted toward the bottom of the sea is in phase with an acoustic wave reflected by the surface of the sea toward the sea floor, said transmitting antenna further including a set of containers attached to said cable at positions for securing the transducer wherein said containers hold said transducers and electronic devices associated with said transducers and wherein said cable includes a device for providing power for said containers and wherein said floatation device includes a well of sufficient size to pass the containers through and wherein said cable slides in said well, said device further including a return pulley which supports said cable and locking devices for immobilizing said cable.

2. An acoustic transmitting antenna for underwater seismic exploration including a floatation device for floating on the surface of the sea and a cable vertically suspended under said floatation device with a set of acoustic sources attached to the cable, wherein said acoustic sources are vibrating motor transducers and are secured at positions whereby an acoustic wave transmitted toward the bottom of the sea is in phase with an acoustic wave reflected by the surface of the sea toward the sea floor, wherein said cable is an electrically conducting cable provided with a set of conductors for providing separate power for each of said transducers and wherein said floatation device includes a cavity holding a hollow and narrow drum for wrapping the cable provided with said transducers and wherein said cavity houses electronic components for powering said transducers through the electrically conducted cable, said antenna further including a rotating joint for connecting said electronic components to a power cable wherein said power cable is connected to a towing ship and said antenna further includes a reduction motor for wrapping the cable with said transducers on said drum.

* * * * *